(No Model.)

W. HUMPHREYS.
WRENCH.

No. 362,278. Patented May 3, 1887.

WITNESSES
Phil. C. Dieterich
A. E. Dowell

INVENTOR
Wm Humphreys.
by J. H. Alexander
Attorney

UNITED STATES PATENT OFFICE.

WILLIAM HUMPHREYS, OF WATERFORD, NEW YORK.

WRENCH.

SPECIFICATION forming part of Letters Patent No. 362,278, dated May 3, 1887.

Application filed October 12, 1886. Serial No. 216,035. (No model.)

*To all whom it may concern:*

Be it known that I, WILLIAM HUMPHREYS, of Waterford, in the county of Saratoga and State of New York, have invented certain new and useful Improvements in Pipe and Nut Wrenches; and I do hereby declare that the following is a full, clear, and exact description thereof, reference being had to the accompanying drawings, and to the letters of reference marked thereon, which form part of this specification, in which—

Figure 1:
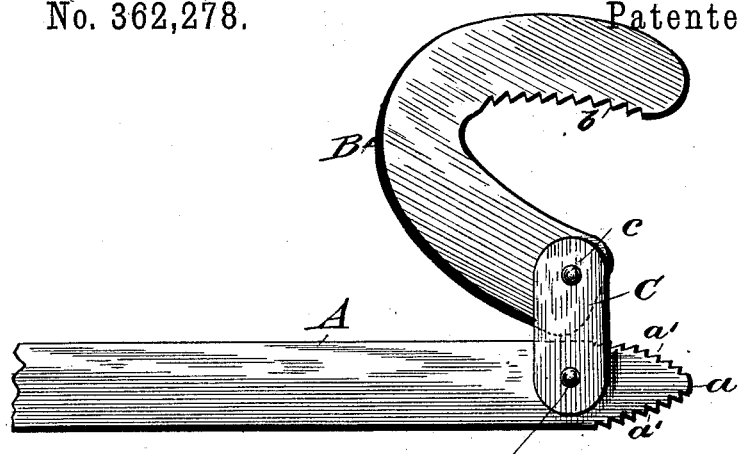
Figure 2:
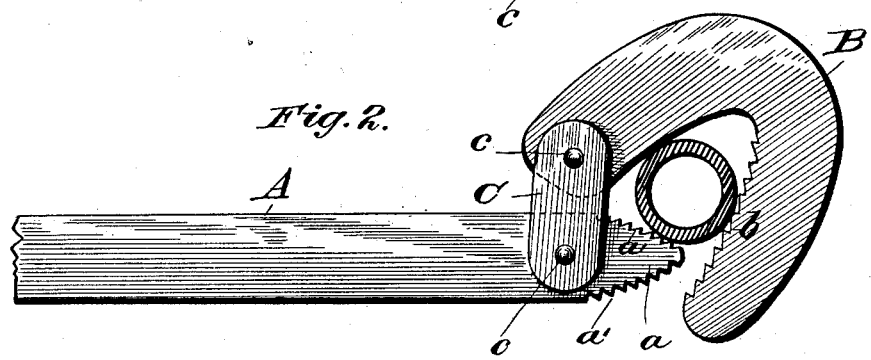
Figure 3:
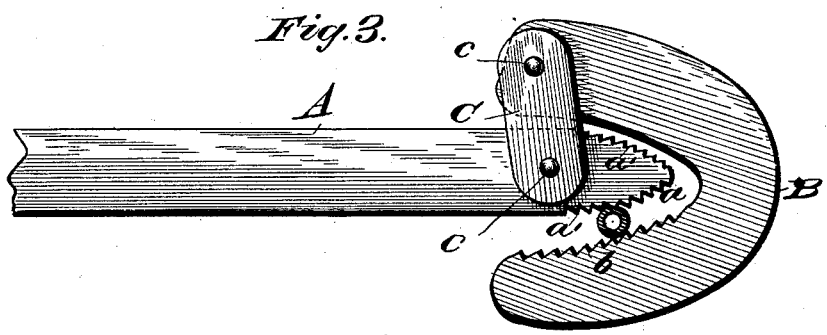
Figure 4:
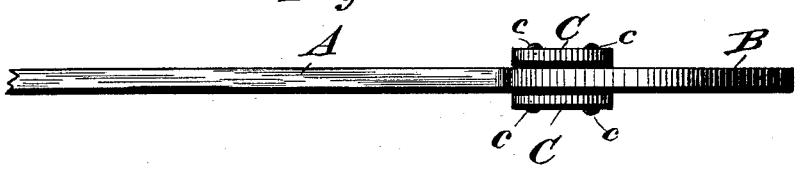

Figure 1 is a side view of my improved wrench opened. Fig. 2 is a similar view showing the same adjusted for turning a large pipe or nut. Fig. 3 is a view showing it as adjusted for turning small pipes or nuts. Fig. 4 is a top view of the same.

This invention relates to improvements in pipe and nut wrenches; and it consists in the novel construction and arrangement of parts of the same, hereinafter described, and particularly specified in the claims.

In the drawings, A designates the main or lever bar of the wrench, which is of suitable length and preferably rectangular in cross-section. This lever is made, preferably, of steel, and its inner end is rounded or half-oval shaped, laterally, as shown in Figs. 1 to 3, so that its upper and lower edges converge. This inner end, $a$, is serrated or toothed, the serrations $a'$ setting in similar directions on the upper and lower edges of lever A, as shown, and serve a purpose hereinafter explained.

B designates a hook or dog made of metal, and rectangular in cross-section. This hook is of a general horseshoe shape, one of its ends, however, being a little longer than the other. The inner curved edge of hook B corresponds for one-half its length with the curvature of one side of the end $a$ of lever A, adjoining it, and is made plain or non-serrated. The other half of the inner edge of the hook is formed on an arc of greater diameter, and is provided with a series of inwardly-standing teeth or serrations, $b$, which set in the same direction as teeth $a'$ of lever A when the hook is in the position shown in Fig. 3, but set in the opposite direction thereto when the tool is adjusted as shown in Fig. 1.

C C designate link-bars, which connect the hook B with lever A. These links are alike in size, and are placed on opposite sides of the lever and hook, being pivoted to lever A by a suitable bolt or rivet, $c$, situated just to the rear of its end $a$. The upper ends of the links are pivoted to the lengthened end of hook B by a similar rivet or bolt.

If the tool is not to be used for very heavy work, one link C would be sufficient; but I use two, preferably, as being less likely to get out of order and more durable. By thus securing the hook B to lever A, the hook is easily adjustable in relation to the end $a$ of the lever, so that the wrench can be quickly applied in position for use or removed after using. When large pipes or nuts are to be handled, hook B is adjusted to the position shown in Fig. 1, and then placed upon the pipe. The lever A is then turned so that one edge of its serrated end $a$ will bear against the pipe, as shown in Fig. 2. The teeth thereof grip the pipe on one side, the teeth of hook B grip the same on another, and the smooth inner edge of the hook bears against the pipe at a third place, so that the pipe is engaged simultaneously at three separate points of its circumference, and firmly held by the serrations or teeth at two of these points when power is applied to lever A. When used to turn small pipes or nuts, the wrench is adjusted in the position shown in Fig. 3, (which is its normal position when not in use,) the hook B being first turned to a position similar to that in Fig. 2 and then pushed rearward, the links C causing its extended end to approach and lie flush against the adjoining edge of lever A as the hook is forced rearward, and the lower portion of end $a$ of lever A entering and closing the correspondingly-curved portion of the hook. The opposite serrated edge of the hook being on a greater arc than that of end $a$, as described, forms, with the outer edge of the latter, a wedge-shaped recess serrated on both edges, and in which small pipes may be engaged, as shown in Fig. 3. When thus used, strain is taken off links C and transferred directly from one arm of hook B to the other through lever A.

I am aware that wrenches have been made having a hook pivoted to a sliding collar on the lever-arm, the collar enabling the user to adjust the wrench to engage different sizes of pipe. Such I do not claim; but, Having described my invention, what I claim as new, and desire to secure by Letters Patent, is—

1. In a pipe and nut wrench, the combination, with a suitable lever-handle having a rounded serrated inner end, of a horseshoe-shaped hook serrated on one-half of its inner edge and adjustably connected to the lever by suitable links, all substantially as and for the purpose specified.

2. In a pipe and nut wrench, the combination of the lever-handle A, having a serrated inner end, as described, with the hook B, having one-half of its inner edge elongated and corresponding in contour to the inner end of the lever and its other half formed on a larger arc and serrated, and pivotal connecting-links secured at one end to the lever near its inner end and at the other to the elongated end of the hook, all substantially as and for the purpose set forth.

3. As a new article of manufacture, the within-described wrench, consisting of lever-handle A, having its inner end, a, rounded and serrated, as described, horseshoe-shaped hook B, having one arm longer than the other and one half of its inner edge formed on an arc corresponding to the inner edge of the end a of the lever A and its other half formed on a larger arc and serrated, and the connecting-links C, pivoted at one end to lever A, near the end a, and at the other end to the elongated arm of hook B, all constructed and adapted to operate substantially in the manner and for the purpose described.

In testimony that I claim the foregoing as my own I affix my signature in presence of two witnesses.

WILLIAM HUMPHREYS.

Witnesses:
LYSANDER BUTTON,
GEO. W. EDDY.